Figure 6:
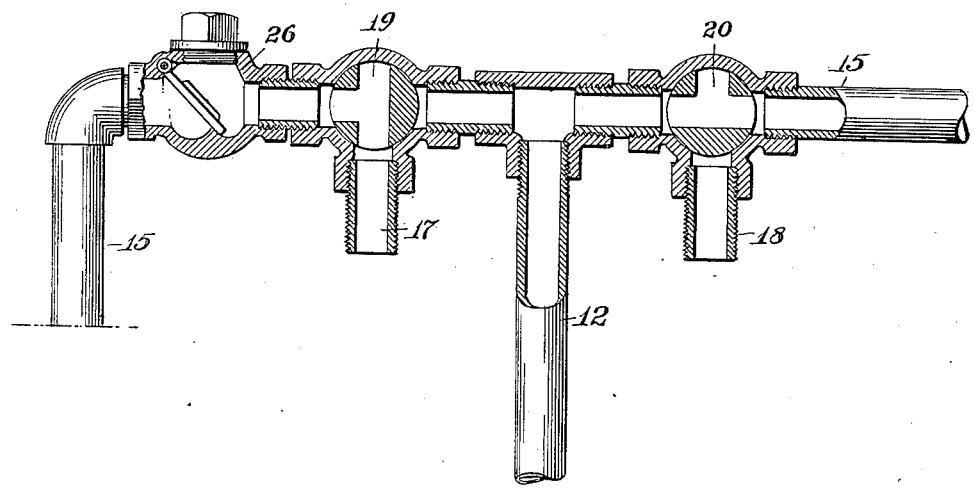

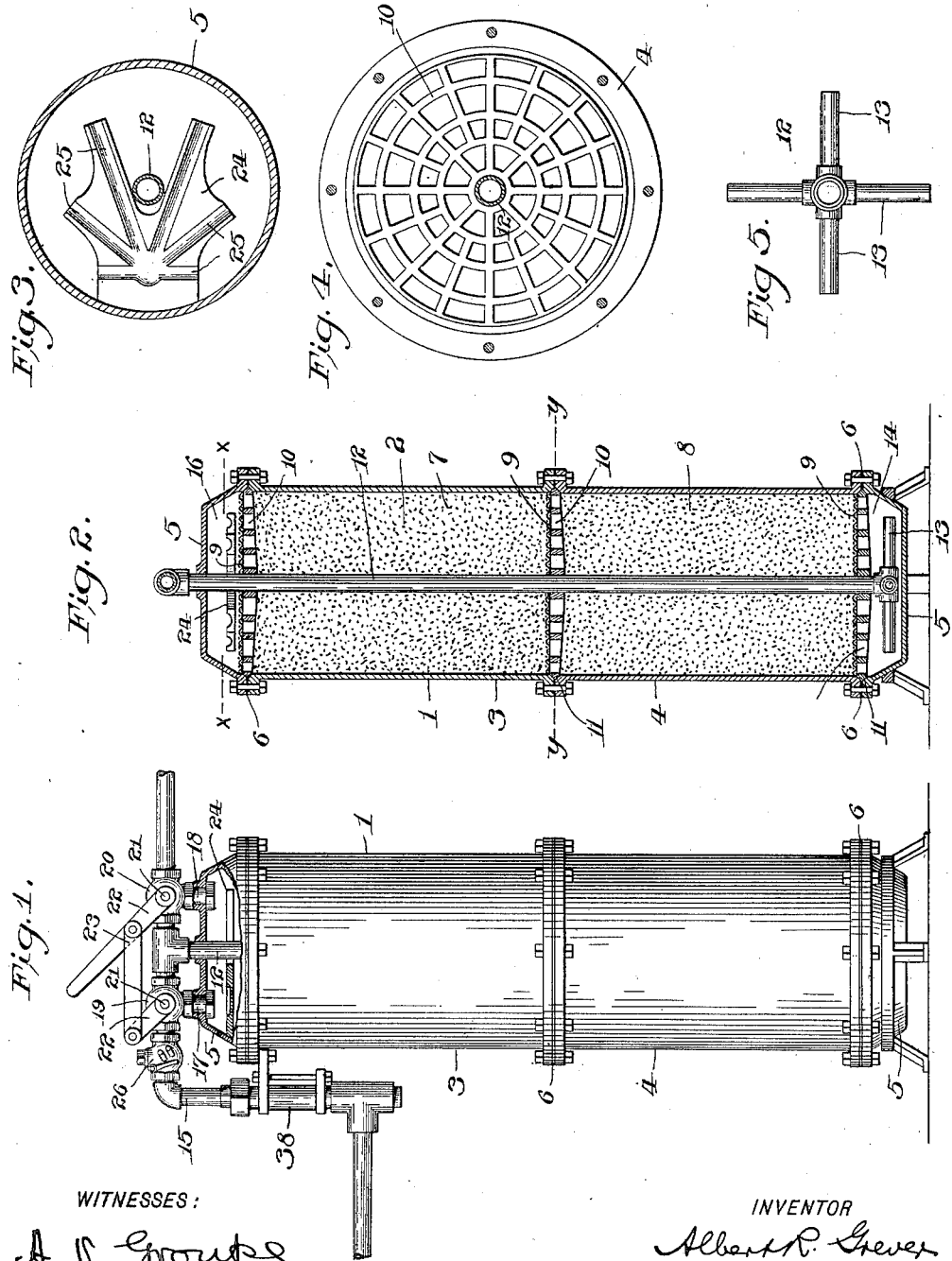

No. 661,339. Patented Nov. 6, 1900.
A. R. GREVER.
FILTER.
(Application filed May 17, 1900.)
(No Model.) 2 Sheets—Sheet 2.

UNITED STATES PATENT OFFICE.

ALBERT R. GREVER, OF PHILADELPHIA, PENNSYLVANIA.

FILTER.

SPECIFICATION forming part of Letters Patent No. 661,339, dated November 6, 1900.

Application filed May 17, 1900. Serial No. 16,982. (No model.)

*To all whom it may concern:*

Be it known that I, ALBERT R. GREVER, a citizen of the United States, residing in the city and county of Philadelphia and State of Pennsylvania, have invented certain new and useful Improvements in Filters, of which the following is a full, clear, and exact description, reference being had to the accompanying drawings, forming a part of this specification.

This invention relates to filters, my object herein being to provide an apparatus of simple and efficient construction wherein a uniform distribution and pressure of the liquid in and throughout the filtering-bed shall be effected and wherein the cleansing of the filtering substance from impurities deposited therein may be expeditiously accomplished.

The invention, briefly described, comprises a casing in which the filtering material is contained, means in said casing for receiving and distributing the inflowing liquid, and certain inlet and outlet passages under the control of suitable valves which may be set to permit the percolation of the liquid down through the filtering material and to permit the discharge of the liquid thus clarified, or which valves may be set to permit a reverse flow of water through the filtering material for the purpose of cleansing such material and carrying off the impurities deposited therein.

The invention also comprises various novel features of construction and organizations of parts, which will be hereinafter particularly described and claimed.

In the drawings, Figure 1 is a side elevation of the apparatus, partly in section. Fig. 2 is a longitudinal section of the body of the apparatus. Fig. 3 is a horizontal section, enlarged, as on the line $x\ x$ of Fig. 2. Fig. 4 is a similar section as on the line $y\ y$ of Fig. 2. Fig. 5 is a plan of the central stand-pipe detached. Fig. 6 is a sectional elevation of the supply-pipe and adjuncts.

1 is a cylindrical casing in which the filtering material 2 is contained. This casing in its preferred construction comprises two flanged sections 3 4, bolted or otherwise secured together, and two outwardly-expanded heads 5, likewise secured to the outer ends of the sections. Suitable gaskets 6, such as basswood, are interposed between the contiguous flanges to insure absolutely tight joints. The body of the casing is divided into two compartments 7 8 by diaphragms 9 of woven wire or other reticulated material, which are supported upon circular grates 10, suitably arranged within the casing. In the present instance the peripheral edges of the grates are V-shaped in cross-section and fitted to corresponding grooves 11, formed in and around the inner abutting edges of the cylinder-sections and end heads in such manner that when the sections and heads are bolted together the several grates will be securely clamped thereby. The filtering material is contained in the compartments thus formed. Extending centrally through the cylinder is a stand-pipe 12, the lower end of which terminates in a series of radiating branch pipes 13 contained within an opening into the space or chamber 14, formed by the bottom end head. The upper end of this pipe extends through the top of the cylinder and communicates with the overlying portion of a supply-pipe 15, which is connected at one end with a source of water-supply, while the other end leads to a suitable point of discharge. This supply-pipe is also connected at two points with the space or chamber 16, formed by the upper end head, the connections in this instance comprising short tubes or nipples 17 18, disposed one on each side of the vertical pipe. Two three-way valves 19 20 are appropriately set within the supply-pipe in respect to the connections, and provision is had whereby the valves may be simultaneously turned more or less to open and close the connections in prescribed order, whereby the liquid from the source of supply may be directed through the connection 17 into the filtering-beds, percolating therethrough into the chamber 14, thence returning through the vertical pipe to the overlying pipe, and passing thence through the valve 20 to the point of discharge. Thus the valves are set preparatory to the filtration of the liquid; but if it be desired to cleanse the interior of the filter from the impurities therein the valves are so set that water will be delivered directly from the supply-pipe to the vertical pipe, flowing therethrough to the chamber 14 and rising therefrom through the filtering-bed, and thence passing by way of the connection 18 to the discharging portion of the overlying pipe and carrying off the impurities deposited in the filtering-bed.

The type of three-way valve which I prefer to employ is clearly shown in Fig. 6, the two valves being therein represented in the relative positions they occupy during the process of filtration. The stems 21 of the respective valves are provided with exteriorly-arranged arms 22, which are united by a link 23, one of the arms being extended to constitute a handle, by the manipulation of which the valves may be concertedly operated. Arranged within the chamber 16 is a distributing member comprising a horizontally-disposed plate 24, provided, preferably, on its upper face with a series of channels 25 of different lengths. The liquid upon entering the chamber impinges against this plate and is evenly spread thereby throughout the chamber, thus insuring an equal distribution and pressure of the liquid on the filtering material and obviating all liability of the channeling which would otherwise occur. Fitted within the overlying supply-pipe in advance of the valve 19 is a check-valve 26, the gate of which is disposed to permit the flow of the liquid to the filter, yet prevent its return past the valve.

The general operation of the apparatus may be briefly described as follows: Assuming the valves to be set in the relative positions indicated in Fig. 6, the water or other liquid to be treated is directed from a suitable source of supply to the pipe 15, thereupon in its course opening the check-valve and passing by way of the valve 19 and connection 17 to the filtering-beds. As the liquid flows into the upper portion of the filter it strikes upon the opposing plate and is distributed thereby upon and throughout the upper portion of the filtering material, percolating therethrough to the chamber at the bottom of the filter. The liquid thus filtered enters the branches at the foot of the stand-pipe, rises in the latter to the overlying pipe, and passes through the open valve 20 to a suitable point of discharge.

If it be desired to cleanse the interior of the filter, the valves 19 and 20 are moved a quarter-turn to the right, so as to close the communication between the connection 17 and the supply-pipe and to effect communication between the connection 18 and the discharging end of said pipe. Water is then directed to the supply-pipe, the same in its course opening the check-valve. This water flows to and down the central stand-pipe and is discharged into the bottom chamber of the casing, and thence rising through the filtering-beds and passing through the connection 18 and valve 20 to the discharging end of the overlying pipe, thus carrying off the impurities which may have lodged in the interior of the filter during the preceding filtering operations.

I claim—

1. The combination with the casing provided with relatively-arranged inlet and outlet openings, the filtering material in said casing, and a horizontally-disposed plate interposed between the inlet-opening and the filtering material, the upper surface of said plate being provided with channels of different lengths, substantially as described.

2. The combination with the casing, and the filtering material therein, of the supply-pipe, a stand-pipe leading from the supply-pipe and opening below the filtering material and connected at its upper end with the supply-pipe, inlet and outlet connections between the supply-pipe and the upper part of the casing, said connections being located on the respective sides of the union of the stand-pipe with the supply-pipe and valve mechanism for controlling the said connections, substantially as described.

3. The combination with the casing and the filtering material therein, of the supply pipe, a stand-pipe leading from the supply-pipe to a point below the filtering material, a series of laterally-extending open branch pipes on the lower end of the stand-pipe, inlet and outlet connections between the supply-pipe and the upper part of the casing, said connections being located on the respective sides of the union of the stand-pipe with the supply-pipe and valve mechanism for controlling the said connections, substantially as described.

4. The combination with the casing, and the filtering material therein, of the supply-pipe, a stand-pipe leading from the supply-pipe and opening below the filtering material and connected at its upper end with the supply-pipe, inlet and outlet connections between the supply-pipe and the upper part of the casing, said connections being located on the respective sides of the union of the stand-pipe with the supply-pipe, three-way valves in said connections, and means for simultaneously setting said valves, substantially as described.

In testimony whereof I have hereunto affixed my signature in the presence of two subscribing witnesses.

ALBERT R. GREVER.

Witnesses:
ANDREW V. GROUPE,
JOHN R. NOLAN.